No. 859,081. PATENTED JULY 2, 1907.
R. G. KENNEDY.
DEVICE FOR CONTROLLING A SUPPLY OF WATER FOR IRRIGATION, &c.
APPLICATION FILED MAY 21, 1906.
2 SHEETS—SHEET 1.
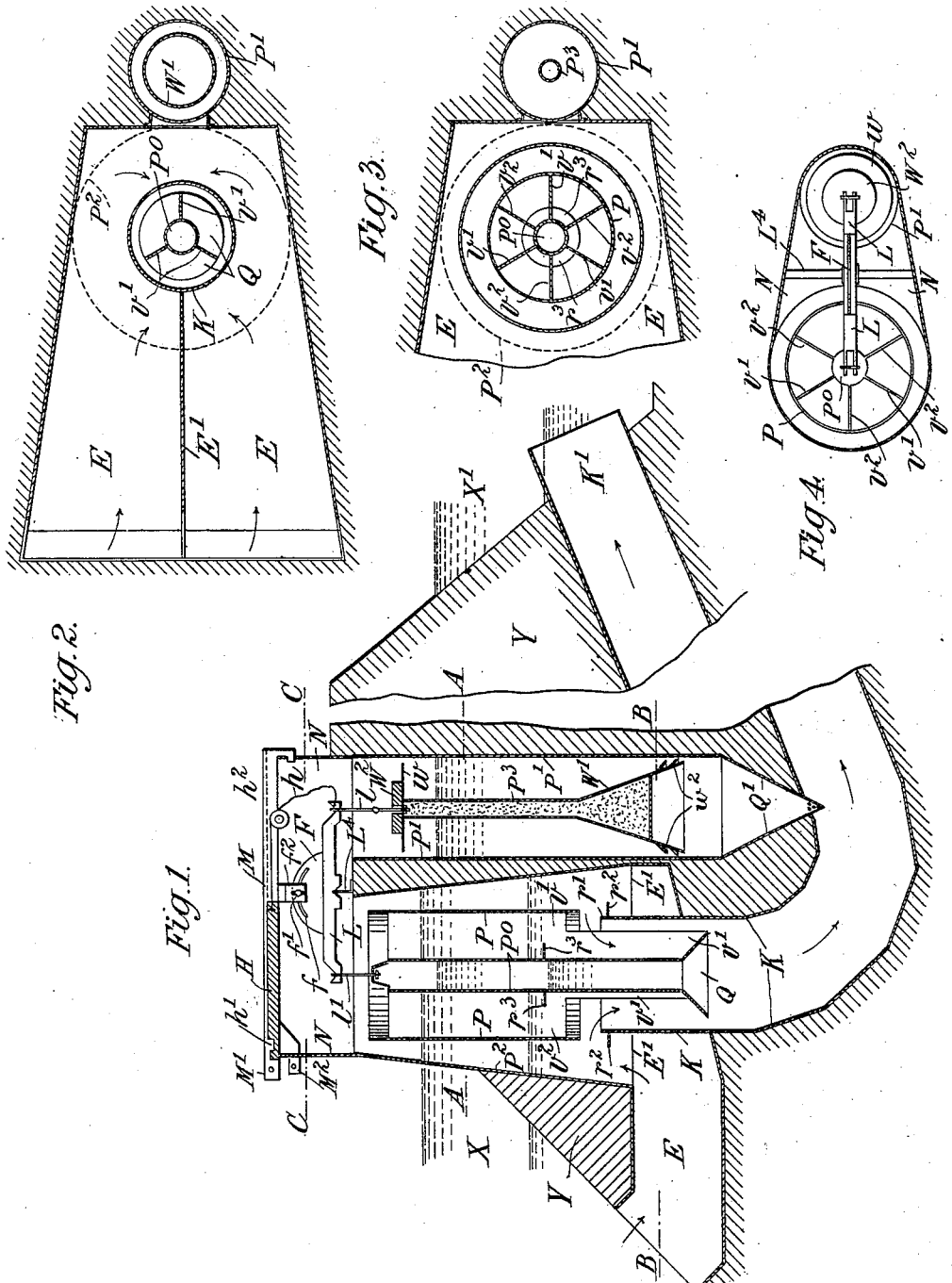
WITNESSES
INVENTOR,
R. G. Kennedy,
by Wilkinson & Fisher,
Attorneys No. 859,081.
PATENTED JULY 2, 1907.
R. G. KENNEDY.
DEVICE FOR CONTROLLING A SUPPLY OF WATER FOR IRRIGATION, &c.
APPLICATION FILED MAY 21, 1906.
2 SHEETS—SHEET 2.
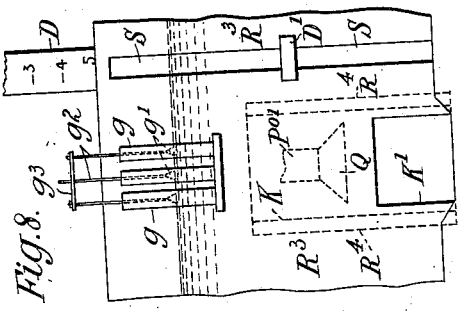
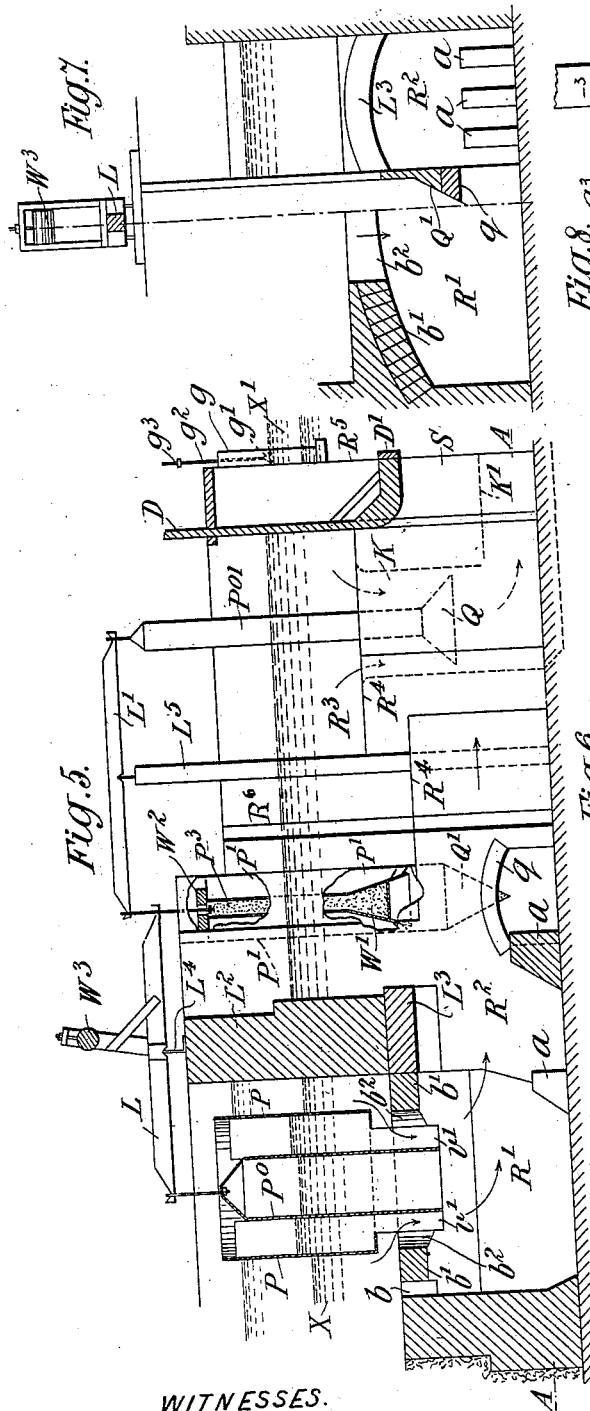
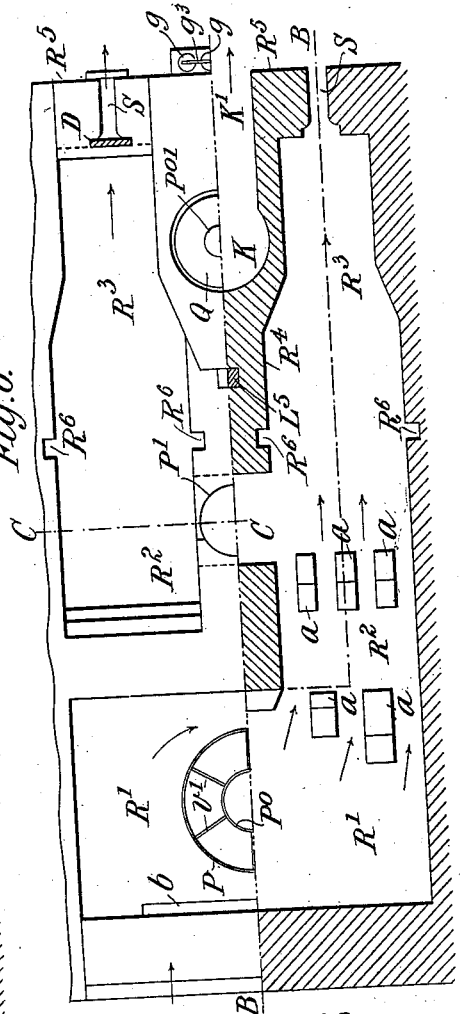
WITNESSES.
INVENTOR.
R. G. Kennedy,
by Wilkinson & Fisher,
Attorneys.

UNITED STATES PATENT OFFICE.

ROBERT GREIG KENNEDY, OF LARGO, SCOTLAND.

DEVICE FOR CONTROLLING A SUPPLY OF WATER FOR IRRIGATION, &c.

No. 859,081. Specification of Letters Patent. Patented July 2, 1907.

Application filed May 21, 1906. Serial No. 318,058.

*To all whom it may concern:*

Be it known that I, ROBERT GREIG KENNEDY, a subject of His Majesty the King of Great Britain, residing at Largo, in the county of Fife, Scotland, have invented a new and useful Improvement in Devices for Controlling a Supply of Water for Irrigation and other Purposes, of which the following is a specification.

The invention relates to an improved device for controlling a supply of water for irrigation and other purposes whereby a constant known and accurate supply of water may be delivered, however much the conditions which usually affect the supply may vary from time to time, and which in other ways meets the practical requirements generally obtaining where irrigation is carried out.

In the accompanying drawings:—Figure 1 is a sectional elevation through a device embodying my invention, and drawn more or less diagrammatically to simplify description. Fig. 2 is a transverse section on the line B, B of Fig. 1. Fig. 3 is a similar view on line A, A of Fig. 1 and Fig. 4 is a similar view on line C, C of Fig. 1. Fig. 5 is sectional elevation of a modified arrangement on the line B, B of Fig. 6. Fig. 6 is a half sectional plan on line A, A of Fig. 5. Fig. 7 is transverse section on line C, C of Fig. 6 and Fig. 8 is an end elevation looked at from the outfall end of the device.

The device, which may be termed a module, illustrated in Figs. 1 to 4 is a convenient form adapted for small discharges such as are usually required for irrigation outlets. It is in use nearly buried in the earthen or other embankment dividing the canal or other source of supply from the watercourse to be supplied.

The device or module consists mainly of a box or chamber E open to the canal or supply source, out of which box E or a conical chamber $P_2$ above and surmounting it passes a pipe K communicating with the outfall or watercourse on the other side of the embankment. The entrance to the pipe K is adapted to be closed by an open ended cylinder P forming a sluice for said pipe which cylinder contains a second open ended cylinder Po rigidly attached thereto, the end of which is extended and terminates in the frustum of a cone Q which projects within the open upper end of the pipe K. The cylinder is suspended from a balance lever L counterweighted by a weighted hollow cylinder $P_3$ located within a cylindrical chamber $P_1$, terminating in a cone Q, which projects into the pipe K, and has a perforated apex. The cylinder $P_3$ is also formed at its lower extremity as the frustum of a cone $W_1$, and with its containing chamber $P_1$, forms a dash pot device. Means are provided for covering in the device and locking same, also for operating the device from the supply side, all of which will hereinafter be more fully described.

The box or chamber E is wedge shape and prefer- ably formed of light steel plates and is built into the embankment Y to form the entrance for the water from the supply X to the controlling device. Surmounting the chamber E is a conical chamber $P_2$, to which the water supply has free admission. Projecting through the chamber E and into the lower part of this chamber $P_2$ is the open end of the pipe K, the exit end $K_1$ of which opens on the outfall side of the embankment as shown in Fig. 1. If desired I may, as shown in Fig. 2, divide the box E into two parts by a longitudinal diaphragm $E_1$. The water flows into E from the supply, in the direction of the arrows on Figs. 1 and 2. It ascends into the chamber $P_2$ and flows over the edge of the pipe K to the outfall, the water rising inside the chamber $P_2$ to very nearly the same level as that of the supply. Located in the chamber $P_2$ and suspended immediately over the pipe K is an open ended cylinder P, and rigidly fixed by radiating vanes or diaphragms $v_1$ $v_2$, centrally within the cylinder P is a second cylinder Po, both ends of which are open and the lower end projects into the pipe K and is formed as the frustum of a cone Q. At the lower end of the cylinder Po each alternate vane $v_2$ is cut away for the sake of lightness, the remaining vanes being sufficient to insure rigidity and steadiness. The purpose of the cylinder P is to open or close the open end of the pipe K to the inflow of water from the supply as and when required, and the purpose of the cylinder Po and cone end Q is to automatically by this means so close or adjust the inflow as to keep it constant. P can also be used to entirely shut off the supply as will hereafter be explained.

Behind the chamber E and conical chamber $P_2$, is a cylindrical chamber $P_1$ the lower end of which is cone shaped at $Q_1$ with the apex projecting into the pipe K and being provided with openings or perforations whereby the water in K can have access to $P_1$. Suspended within this cylinder $P_1$ is a hollow cylinder $P_3$ the lower end of which is closed and is formed as the frustum of a cone $W_1$. This cylinder $P_3$ is adapted to be weighted by filling it with any suitable material, and additional weights $W_2$ may also be added for purposes of adjustment. The upper end of the cylinder $P_3$ may as shown be provided with a disk $w$ of nearly the diameter of the cylinder $P_1$, and is suspended by a connection $l$ from one arm of a balance lever L having its knife edge fulcrum at $L_4$, to the other arm of which lever is attached, by a connection $l_1$, the cylinders P and Po. The weighted cylinder $P_3$ and $W_1$ are so adjusted as to exactly balance the cylinders P, Po, when suspended in still water and the coned end $W_1$ of the weighted cylinder $P_3$ is so formed as to have a dash pot action in conjunction with the cylinder $P_1$ which action may be increased by providing the coned end $W_1$ with several rims $w_2$ which accurately, but loosely, fit the cylinder walls $P_1$.

This dash-pot action serves to steady any oscillatory movements up and down of the cylinder $P_3$ due to the like movements of the cylinders P Po.

The upper part of the regulating or controlling device is inclosed by a suitable casing N (Figs. 1 and 4) provided with a sliding cover M which may be locked at $M_2$ to N against outside interference and to prevent tampering with the device when once set.

The supply of water is cut off entirely when the cylinder P descends and covers the open end of the pipe K, the lower edge of P seating upon an annular ledge or flange $r_2$ carried by the pipe K and near the upper edge thereof (Fig. 1) and this closing of the supply may be effected from outside, preferably on the supply side of the embankment as follows:—The cover M may have a central rib formed hollow within which is adapted to slide loosely a bar H. At the inner end of the bar a cord $h$ or flexible connection is attached which passes over a pulley $h_2$ and is attached to the end of the lever L farthest from the cylinder P. The other end of the bar H is shaped or slotted at $h_1$, to receive a key or the like by means of which the bar may be drawn outwardly, thus tightening the cord $h$ and raising that end of the lever L to which the weighted cylinder $P_3$ is connected, and lowering the cylinders P, Po for the former to effect the closure of the pipe K. The bar H can then be locked in the closed position at $M_1$ the closure remaining intact until the unlocking of the bar H releases the latter and the weighted cylinder $P_3$ $W_1$ acts to restore the balance and raise the cylinders P, Po to again permit water to flow into the pipe K.

As has already been stated the weight of $W_1$ is so adjusted in still water that it just balances P and Po et cetera, but when in flow there is a downward pressure on Q which has to be balanced by an adjustable weight $W_2$. It is this difference of pressure head above and below Q which determines the discharge there passing, and the main principle involved is to keep this difference constant, however the surface levels up or downstream may vary. The action which takes place is as follows:—So long as the down pressure on Q is just balanced by $W_2$ there is no tendency for Q and P to move up or down, the water entering between the upper rim of K and the lower rim of P, stands in the annular space between P and Po at such a level as just to give the balanced static head of pressure on Q. This annular space is therefore a sort of regulating chamber keeping a constant pressure on Q. Should however the level in the supply channel rise, then the level in this chamber would also rise, pressure on Q would increase and outweight $W_2$, so that P and Po et cetera, would slowly move downwards, thus decreasing the waterway of entry, and lowering again the level in the annular space till the pressure on Q was reduced to its original amount. An exactly similar but reversed action would take place if the supply channel fell in level, the whole balance being extremely sensitive and working quite quietly. $W_2$ is therefore the measure of the discharge passing Q, and by varying this weight the discharge can be varied.

The above is the general action which takes place, but experience has shown that there are subsidiary forces which come into play, and which must be balanced so as to insure correctness under all conditions. Thus the diameter of $P_3$ is calculated so that $W_1$ and $P_3$ may balance P and Po et cetera, in still water at whatever level the water may stand, in other words differences of weights due to more or less immersion balance themselves. Again as P and Po etcetera, move down (when supply level rises) $P_3$ will move up, thus decreasing by flotation the weight of the former and increasing that of the latter. This however is found to be nearly balanced by a certain excess pressure on Q which comes into play the higher the head lost through the module or the lower P is, and is due partly to impact of the descending jet of water on Q and partly to skin friction on Po. Whatever may be the slight unbalanced force still remaining is balanced by a slight upward pressure on a small projecting ring $r_3$ attached to Po, due to an upward jet of water which here flows along Po. The height of the rim $r_1$ of the pipe K projecting above the flange $r_2$ has also a very slight effect on these last two forces; but the general intention, as finally secured by actual prolonged experiment for different sized modules, and varying discharges is to insure that in all positions and circumstances these several forces will balance among themselves, leaving the weight $W_2$ to always measure the discharge past Q, as already explained. To clearly show what this discharge is the necessary figures may be marked on each weight $W_2$ in use.

The lever L is shown in Fig. 1 provided with a semicircular plate F having a similarly curved slot $f$ therein through which passes a screw $f_1$ supported in brackets $f_2$ whereby the device may be clamped in any particular position; or the slot can be used to limit the range of movement in either direction. By this means the device could, if so desired, be used as a limited module, that is, giving the desired discharge within certain ranges of supply level in the feeder channel; above that, giving more and below, less. This would insure floods passing off harmlessly, and low supplies being distributed proportionately to all the various outlets and shareholders, whenever the available supply was too low to satisfy all demands.

The outer end of the exit pipe $K_1$, is raised well above the bed of the feeder channel so as to prevent those outlets which happen to be in low ground drawing off more than their share when the supply level falls very low. The working of the device is not affected by muddy water or water carrying silt or floating matter, the larger detritus being caught on a grating at the entrance to the box E (whence it can be readily removed), and the smaller simply passing through.

Though the loss of head through the outlet can be made very small—as low as three inches—yet in some cases there will be doubt whether the head is sufficient and is giving the full discharge, and when this is so, it can be ascertained by merely observing at what position the cylinder P is working. Thus if head is too low, P will rise as far as possible, $W_1$ will sink similarly, and the position so assumed can be known by merely feeling with the opening key where the sliding bar H is, when the cord $h$ is just pulled tight. The cultivators can thus themselves ascertain when it is necessary to clear out their water courses.

The modified arrangement Figs. 5 to 8, is for larger discharges, such as for a minor distributing channel head and consists of a modification of the parts described above, with a masonry setting. It is contained in an approximately rectangular chamber divided by masonry erections into the parts $R_1$ $R_2$ $R_3$ and having a longitudinal division wall $R_4$. The end wall $R_5$ of the chamber at the outfall end is provided with discharge openings or notches S having sliding shutters D and bases $D_1$ whereby the amount of opening and consequently of discharge may be regulated. Appliances for keeping the balance of the operating parts constant, and for indicating the difference of the levels above and below the discharge openings are also provided, and will hereinafter be more fully described.

The operating parts are contained in an approximately rectangular chamber divided by a longitudinal division wall $R_4$ into two parts, which are again divided transversely into chambers or sections $R_1$ $R_2$ $R_3$ by masonry sills $a$ which are merely to break up the current and so insure there being no appreciable velocity of approach which might otherwise interfere with the discharge. Across the upper or supply end $R_1$ of the chamber is built an arch $b_1$ having a central circular opening $b_2$ the diameter of which is a little less than that of the cylinder P, which latter has an inner cylinder Po, the arrangement being similar to that of the previously described device. The cylinders P, Po are, as before, suspended from a balanced lever L, with fulcrum at $L_4$ supported upon a brick or other erection $L_2$ in turn supported upon arches $L_3$ and above the chamber $R_2$. Through the opening $b_2$ and under P the water enters into the space $R_1$ beneath the arch, and thence divides into two currents, one on each side of the longitudinal dividing wall $R_4$. The water flows between the sills into the section $R_2$ beneath the arches $L_3$ and thence through more sills $a$ into the chambers $R_3$ which however are connected across the top of the division wall $R_4$, which does not extend to the roof of the chamber. At the down stream end of each chamber $R_3$ is a vertical narrow opening or notch S of any suitable section with a shutter D and base $D_1$ slidable up and down to vary the height of the opening and therefore the discharge passing. The outfall end of the division wall $R_4$ is widened out to receive the exit pipe K and $K_1$ which is built into the wall as shown in Figs. 5 and 6, and the arrangement is such that the "head" or difference of level up stream and down stream of the notches or openings S, and up stream and down stream of the pipe K and $K_1$ will always be constant. It is intended to automatically as hereinafter described maintain a constant head of water over these notches, and over K, so that the discharge is at once known for any given design and size of notch, and will be merely so much per lineal foot of opening, plus the constant known discharge passing through K and $K_1$. $R_3$ is in fact a regulating chamber taking the place of the annular space between P and Po in the smaller outlet module.

$Po_1$ working in the exit pipe K carries at its end the cone frustum Q instead of the cylinder Po as in the other case. The connection of P and Po with the dash pot arrangement and counterbalance weight $W_1$ in the cylinder $P_1$ is also as before, by means of the lever L; and the weight $W_2$ and cone $Q_1$ at lower end of $P_1$ are also unchanged. The down pressure on Q is now communicated to $P_3$ by means of a second lever $L_1$ having its fulcrum on a standard beam $L_5$ shown as built into the division wall $R_4$. In this arrangement it will be seen that so long as the downward pressure on Q (due to a definite difference of level between the water in $R_3$ and the outfall $X_1$ through the notches S) plus the weight of $Po_1$ and P and Po etcetera, just balance the weight of $P_3$ and $W_1$ plus that of $W_2$, there is no tendency for P to move up or down. Should however the level in the supply channel X rise, then an excess discharge passes under P raises the level in $R_3$, causes an excess of downward pressure on Q which raises $W_1$ and lowers P thus decreasing the waterway and discharge till the former pressure on Q is again obtained. Q therefore acts as a controller of the "head" or difference of level of water up stream and down stream of the notches, and since all the other weights, except the pressure on Q, are balanced among themselves in still water (as in the smaller module), this "head" so controlled will depend on $W_2$ only. The value of $W_2$ required to give any desired head can be calculated from known experimental data, but in order to render error impossible a simple differential gage such as $g$ (Figs. 5, 6 and 8) may be ordinarily used, which would show at a glance the actual working difference of level up stream and down stream of the notches, so that, the height of notches open being also known, there could be no uncertainty as to the discharge passing. This differential gage may be of any simple type, such as that shown which merely consists of three tubes $g$ each with a float $g_1$ and rod $g_2$, the two outer of these being connected with the down stream water and the center one with the up-stream, the actual difference of level being read off a graduated scale which may be marked on the central rod where it passes through a horizontal rod or bar $g_3$ hinged to each of the side rods.

The balancing of the minor forces due to differences of flotation, skin friction and the like is here performed by a weight $W_3$, which when properly adjusted as to position and amount will insure the three movable pieces P and Po; $P_3$ and $W_1$; and $Po_1$ and Q always being in equilibrium in any position in still water. Thus as $P_3$ and $W_1$, sink more into the water they weigh less; P and Po and also $Po_1$ at the same time weigh more, but the increased moment of $W_3$ due to this movement is such as just to counterbalance all such changes.

The opening shown at $b$ in Figs. 5 and 6 is merely to save loss of head by giving more waterway into $R_1$ and would only be used where the discharge to be run was high and the available head limited. The small arch $q$ under $Q_1$ is merely to allow free entry of water into the holes at the apex of $Q_1$.

In the grooves $R_6$ shown in Figs. 5 and 6, vertical gratings may be held, across the chambers $R_3$ in case it is desired still further to steady the flow just above the notches S, though usually this will not be necessary.

The whole device may be roofed over and inclosed by side walls if so desired as to prevent interference.

What I claim is:—

1. In devices for controlling water supply and in combination, an inlet, a movable cylinder forming a sluice for said inlet, means for balancing said cylinder, an outlet, and means for controlling the movement of the cylinder to keep constant and indicate the amount of the water supply.

2. In devices for controlling water supply, and in combination, an inlet, a movable cylinder forming a sluice for said inlet, means for balancing said cylinder, an outlet, and means supported by the cylinder for controlling the movement of same to keep constant the water supply.

3. In devices for controlling water supply, and in combination, an inlet on the supply side and an outlet on the outfall side, a movable cylinder forming a sluice for regulating the amount of inlet water from a given maximum to zero, means for balancing the cylinder, and means for controlling the movement of the cylinder to keep constant the water supply.

4. In devices for controlling water supply and in combination, an inlet, an outer movable open ended cylinder forming a sluice for said inlet, an inner movable open ended cylinder rigidly connected thereto, means for balancing said cylinder, an outlet, and means supported by said inner cylinder for controlling the movement of the latter and the outer cylinder to keep constant the water supply.

5. In devices for controlling water supply and in combination, an inlet, a movable cylinder forming a sluice for said inlet, means for balancing said cylinder comprising an adjustably weighted body, a fulcrumed lever attached thereto and to said cylinder, an outlet, and means in connection with said cylinder whereby the movement of the latter is controlled to keep constant the water supply.

6. In devices for controlling water supply and in combination, an inlet, a movable cylinder forming a sluice for said inlet, means for balancing said cylinder, a dash pot in connection with said means, an outlet, and means in connection with the cylinder whereby the movement of the latter is controlled to keep constant the water supply.

7. In devices for controlling water supply and in combination, an inlet, an outer open ended cylinder forming a sluice for said inlet, an inner open ended cylinder rigidly connected thereto, means for balancing said cylinders, an outlet, and means comprising a cone frustum carried by an extension of said inner cylinder to project into said inlet for controlling the movement of said cylinders to keep constant the water supply.

8. In devices for controlling water supply and in combination, an inlet, a movable cylinder forming a sluice for said inlet, means for balancing said cylinder, an outlet, means for controlling the movement of said cylinder to keep constant the passage of water to said inlet, and means for locking said cylinder against movement in any desired position, and for releasing same when desired.

9. In devices for controlling water supply, and in combination, a regulating chamber, an inlet and outlet pipe having its inlet end in said chamber, a movable cylinder suspended in said chamber forming a sluice for said inlet, means for balancing said cylinder, and means connected with said cylinder whereby the movement of the latter is controlled to keep constant the water supply.

10. In devices for controlling water supply, and in combination, a regulating chamber comprising a lower box and an upper conical chamber, an inlet and outlet pipe having its inlet end in said regulating chamber, a movable cylinder suspended in said conical chamber forming a sluice for said inlet, means for balancing said cylinder, and means connected with said cylinder whereby the movement of the latter is controlled to keep constant the water supply.

11. In devices for controlling water supply, and in combination, a regulating chamber comprising a lower box and an upper conical chamber, an inlet and outlet pipe having its inlet end in said regulating chamber, a movable cylinder suspended in said conical chamber forming a sluice for said inlet, means for balancing said cylinder, and means comprising an inner cylinder rigidly attached within said movable cylinder and projecting into said inlet pipe, and a cone frustum supported by said inner cylinder for controlling the movement of both the inner and movable cylinders to keep constant the supply of water.

12. In devices for controlling water supply, and in combination, a regulating chamber comprising a lower box and an upper conical chamber, an inlet and outlet pipe having its inlet end in said regulating chamber, a movable cylinder suspended in said conical chamber forming a sluice for said inlet, a separate cylindrical chamber adjacent to the regulating chamber, an adjustable balance weight located in said cylindrical chamber, a balanced lever connecting said balance weight and said movable cylinder, and means in connection with said movable cylinder for controlling the movement thereof to keep constant the supply of water.

In testimony whereof I have hereunto set my hand in the presence of two subscribing witnesses.

ROBERT GREIG KENNEDY.

Witnesses:
GEORGE COBB,
JAMES GARDNER.